3,073,863
PARA-PHENOXY-ACETYLAMINO-PHENOL DERIVATIVES

Willard J. Croxall, Elkhart, Ind., and Charles D. Burton, Holland, Mich., assignors to Miles Laboratories, Inc., Elkhart, Ind., a corporation of Indiana
No Drawing. Filed May 5, 1958, Ser. No. 732,828
1 Claim. (Cl. 260—559)

This invention relates generally to derivatives of p-aminophenols, and more particularly, to a new series of compounds having the formula:

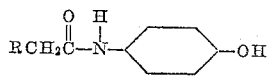

wherein R is selected from the group consisting of alkyl substituted phenoxy radicals. Compounds coming within this formula have excellent oil solubility, and are useful as antioxidants for rubber and various resinous polymers.

The present compositions are prepared by reacting p-aminophenol (hereinafter sometimes abbreviated "PAP") with an acid which will provide the desired acyl radical $RCH_2CO-$, in the presence of boric acid, as represented by the following equation:

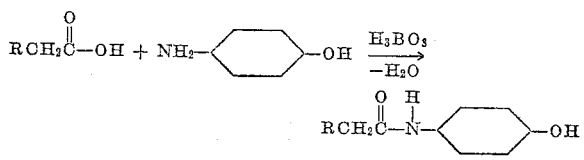

wherein R has the meaning ascribed to it above. Preferably the acid reactant is dissolved in a suitable solvent which will not enter into the reaction but which will provide a good reaction medium, such as toluene, and the reaction is carried out under reflux conditions. Preferably, also, an inert atmosphere, e.g., carbon dioxide or nitrogen, is provided in the reaction vessel while the reaction is taking place. During the reflux reaction water formed in the reaction is removed as an azeotrope with toluene. After the reaction has been completed, the toluene is stripped from the reaction mixture, the remaining material being then preferably decolorized with activated carbon in a suitable solvent such as isopropanol, and the decolorized product crystallized from the solvent.

The p-aminophenol and many species of the reactant acid, which are used as starting materials in preparing the present compositions, are commercially available. Those species of the acid which may not be easily procured in the market may be prepared by methods well known in the art. Representative acids which may be reacted satisfactorily with PAP to produce the instant novel compounds are those derivatives of acetic acid in which the R-group, in the above formula, is 2,4-di-secondary butyl phenoxy; p-secondary butyl phenoxy; and p-nonylphenoxy. Further operative acids are those derivatives of acetic acid in which the R-group is $R'R''C_6H_3O-$ wherein R' and R" may be hydrogen or an alkyl group provided that R' and R" are not both hydrogen, and

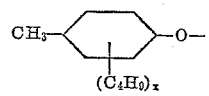

wherein x is an integer less than 5.

The following specific examples illustrate representative compounds encompassed by our invention, and a method for their production.

EXAMPLE 1

*Preparation of p-Nonyl Phenoxyacetyl-p-Aminophenol*

One hundred and sixty-four (164) g. of PAP, 12 g. of boric acid, and 608 g. of a toluene solution which contained 423 g. of β-(p-nonyl)phenoxyacetic acid, were mixed and heated to reflux temperature under a nitrogen atmosphere. After refluxing had continued for about 3 hours, 36 ml. of water formed in the reaction had been removed as an azeotrope with toluene. The resulting reaction mixture was stripped of 112 g. of toluene, and the remaining mixture treated with 15 g. of char in 88% isopropanol. Attempts to crystallize the product by diluting the solvent to 40% with water were unsuccessful, resulting in a black oil. The oil was stripped of solvent to form a very stiff tar containing the final product.

EXAMPLE 2

*Preparation of 2,4-Di-Secondary Butyl Phenoxyacetyl-p-Aminophenol*

One hundred and sixty-four (164) g. PAP, 12 g. boric acid, and 623 g. of toluene solution containing 395 g. of 2,4-di-secondary butyl phenoxyacetic acid were mixed and heated to reflux under nitrogen atmosphere. During the first three hours of refluxing, 32 ml. of water were separated from the reaction mixture. The reaction mixture, which solidified when cooled, was stripped of toluene at reduced pressure (about 10 mm. Hg), decolorized with 15 g. of activated carbon, and recrystallized from 40% isopropanol. On cooling during recrystallization, the product tended to oil out, but agitating the recrystallizing mixture at 5 to 10° C. solidified the oil particles. The crystallized product was filtered off, and washed first with 200 ml. of cold 40% isopropanol, then with sodium hydrosulfite water, and, finally, with tap water. The product was then recrystallized from 40% isopropanol, yielding 287 g. of a slightly yellow solid; melting point, 140.5–141.5° C.

EXAMPLE 3

*Preparation of p-Secondary Butyl Phenoxyacetyl-p-Aminophenol*

Thirty-nine (39) g. PAP, 3 g. boric acid, and 306 g. of a toluene solution containing 69.5 g. of β-p-secondary butyl phenoxyacetic acid were mixed and maintained at reflux temperature under nitrogen atmosphere for 6½ hours, during which time 10.4 ml. of water was removed therefrom as an azeotrope with toluene. The reaction mixture was stripped of 263 g. of toluene, and the remaining mixture was recrystallized from 40% isopropanol. Oil which separated initially during the recrystallization was solidified when the recrystallization medium was cooled to 2° C. The recrystallized product was recovered by filtration, washed with isopropanol, and dried to give 67 g. of a product of slight yellow color; melting point 119–120.5° C.

What is claimed is:
2,4-di-secondary butyl phenoxyacetyl-p-aminophenol.

References Cited in the file of this patent
UNITED STATES PATENTS

| | | |
|---|---|---|
| 2,423,730 | Salminen | July 8, 1947 |
| 2,653,158 | Young et al. | Sept. 22, 1953 |
| 2,711,415 | Cottle | June 21, 1955 |
| 2,730,500 | Young et al. | Jan. 10, 1956 |
| 2,852,540 | Young et al. | Sept 16, 1958 |
| 2,945,870 | Young | July 19, 1960 |

OTHER REFERENCES

Lucas: Organic Chemistry (2nd ed.), pages 508–509, published by American Book Company, New York (1953).